UNITED STATES PATENT OFFICE.

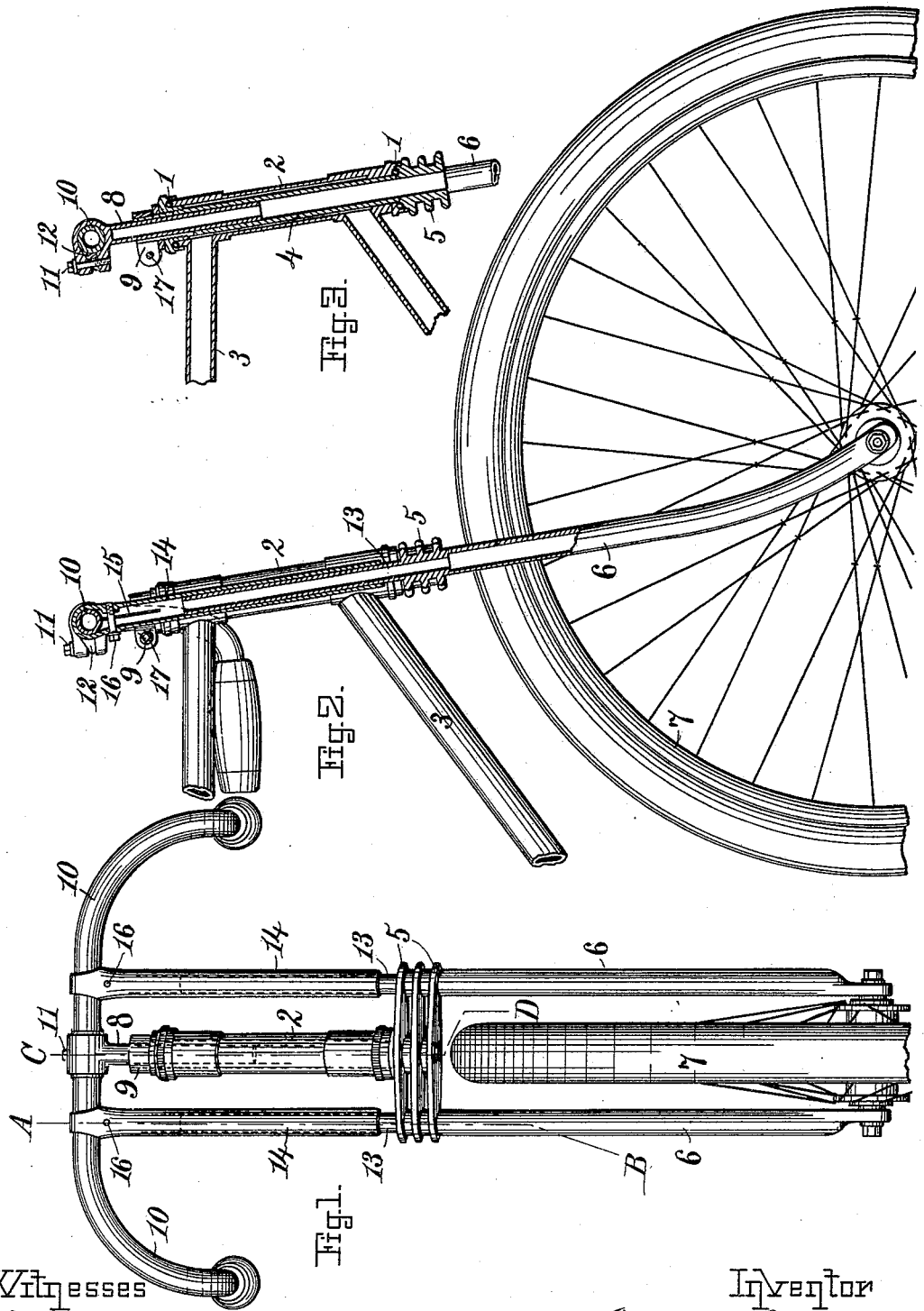

GUSTAF PETERSON, OF CAMBRIDGE, MASSACHUSETTS, ASSIGNOR OF ONE-THIRD TO JOHN A. SCHULTZ, OF SAME PLACE.

BICYCLE.

SPECIFICATION forming part of Letters Patent No. 614,409, dated November 15, 1898.

Application filed June 8, 1898. Serial No. 682,875. (No model.)

*To all whom it may concern:*

Be it known that I, GUSTAF PETERSON, of Cambridge, in the county of Middlesex and State of Massachusetts, have invented certain new and useful Improvements in Bicycles, of which the following is a specification.

This invention relates to improvements in bicycles, and particularly to the head and front fork of the bicycle, its object being to enable one to use what is known in the trade as a "triple" head to secure the full advantages of the same and at the same time to secure a vertical and a rotary adjustment of the handle-bars without changing the appearance or reducing the strength of the triple head.

With this object in view my invention consists of the arrangement, construction, and combination of the parts, substantially as will be fully described hereinafter and claimed.

The invention is carried out substantially as illustrated on the accompanying drawings, which form an essential part of this specification, and whereon—

Figure 1 represents a front elevation of the front fork, the head, the handle-bar, and a portion of the front wheel of a bicycle provided with my invention. Fig. 2 represents a vertical section on the line A B, shown in Fig. 1. Fig. 3 represents a vertical section on the line C D, as shown in Fig. 1.

Like characters of reference refer to like parts wherever they occur on the different parts of the drawings.

It has been found that great strength combined with a good style has been obtained by the use of a triple head on a bicycle or tricycle; but in the triple heads on the bicycles now in use there has been no vertical or rotary adjustment of the handle-bars possible, as the sides of the front fork have been carried upward on either side of the bearing in which the front fork turns and have been rigidly attached to the handle-bar.

The object of my present invention, as above set forth, is to still retain the strength and style of the triple heads, but at the same time to allow of an easy vertical and rotary adjustment of the handle-bars to suit the rider.

Within roller-bearings 1 1 in the front head 2 of the frame 3 of the bicycle is rotatably mounted the hollow tubular spindle 4 of the front fork, which fork consists of the said spindle, the crown 5, and the sides 6 6. The front wheel 7 of the bicycle is rotatably mounted within the front fork in any well-known manner now in common use. Within the tubular spindle 4 of the front fork is placed the stem 8 in such a manner that it can be adjusted up and down within said spindle, it being held in its adjusted position by means of any suitable clamping device, as the clamp 9, which is mounted upon the outside of the upper split end of the spindle and acts to contract said spindle upon the stem, so as to prevent it from moving after it has been adjusted to the desired position. The particular manner of clamping the stem within the tubular spindle forms no essential part of my invention and may be varied by the use of any well-known device for accomplishing this result.

Within a bearing in the top of the stem 8 is mounted the handle-bar 10, which may be bent into any desired form and which may be rotated within its bearing in the stem so as to adjust the handles of the handle-bar to any desired angle. The stem 8 is provided with any suitable clamping device to clamp the handle-bar in its adjusted position, and on the drawings this clamping device has been illustrated as being constructed by longitudinally slotting the bearing in the stem, drawing the same tightly around the handle-bar by means of a clamping-screw 11, and inserting a shoe 12 within the tapering slot in said bearing, which shoe is forced against the side of the handle-bar by the tapering sides of the slot in the bearing and firmly holds the handle-bar in its adjusted position. The particular manner of making the handle-bar rotatably adjustable within the stem 8 forms no essential part of this my present invention and may be varied by the use of any of the common and well-known devices now in use to accomplish that result.

Thus far I have described nothing more or less than a bicycle having a vertical and rotary adjustable handle-bar, such as are in common use and of which there are various constructions which might be substituted for that shown on the drawings. The gist of my present invention is to combine with such a bicycle or with one having only the vertically-adjustable handle-bar mechanism whereby the bicycle may be provided with a triple head, and such mechanism is constructed as follows: The sides 6 6 of the front fork are provided with the extensions 13 13 above the crown 5, which extensions are preferably slightly reduced in outside diameter from the diameter of the side bars below the crown, so that they can enter side stems 14 14 on the handle-bar and form a telescopic joint with said side stems. The side stems are preferably the same diameter on the outside as the diameter of the sides below the crown to add to the symmetry of the head and are provided with a perforation through the top of the same, through which the handle-bar passes and within which the handle-bar is rotatably mounted to allow of a rotary adjustment of the handle-bar. It will thus be seen that the side stems are hung upon the handle-bar, one on either side of the main stem 8, and that they will also allow the handle-bar to be adjusted vertically, as said side stems will slide up or down upon the extension of the sides on account of their telescopic connection with the sides.

The side stems are each provided with a clamping device whereby they may be firmly clamped to the handle-bar after the handle-bar has been rotatably adjusted within said side stems and the main stem 8. On the drawings this clamping device has been shown as being formed by slotting the side stems at 15 and providing them with the clamping-screw 16; but any other and well-known device may be used to clamp said side stems, if so desired, without departing from the spirit of my invention.

The operation of this my invention is as follows: If it is desired to adjust the handle-bars vertically, it is only necessary to loosen the clamp 9 by unscrewing the clamping-screw 17, when the handle-bar will be free to be moved up or down, as the stem 8 will be free to slide up or down within the tubular spindle 4 and the side stems 14 14 will be free to slide up and down upon the extensions 13 13. The handle-bar can then be firmly held in place by tightening the clamp upon the tubular spindle. It will be seen that by this construction of the triple head the same appearance is retained at all of the vertically-adjusted positions of the handle-bar and that the strength imparted to the handle-bar and front head 2 by the use of the triple head is not lessened by this adjustment.

If it is desired to adjust the handle-bar rotatably, it is only necessary to loosen the clamping-screw 11 in the stem 8 and the clamping-screws 16 16 in the side stems 14 14, when the handle-bar will be free to be rotated within its bearings in the stem and the side stems and can be firmly held again by tightening said screws.

It will be understood that I may, if so desired, dispense with the rotary adjustment of the handle-bar, and in such a case may permanently attach the stem and side stems to the handle-bar; also, that my invention is applicable to tricycles, as well as to bicycles.

Having thus fully described the nature, construction, and operation of this my invention, I wish to secure by Letters Patent and claim—

1. In a bicycle or tricycle, a front head, a fork for the front wheel pivoted in said head, extensions to the sides of said fork, a handle-bar, a stem on the handle-bar movable vertically in a line with the pivot for said fork, and side stems upon the handle-bar movable vertically on said extensions, whereby a triple head is formed which retains its strength and style at all positions to which it may be adjusted, for the purpose set forth.

2. In a bicycle or tricycle, a front head, a fork for the front wheel pivoted in said head, extensions to the sides of said fork, a stem movable vertically in a line with the pivot for said fork, side stems movable vertically on said extensions, a handle-bar rotatably mounted and adjustable in said stem and side stems, whereby the handle-bar is vertically movable and rotatably adjustable and a triple head is formed which will retain its strength and style at all positions to which the handle-bar may be adjusted, for the purpose set forth.

In testimony whereof I have affixed my signature in presence of two witnesses.

GUSTAF PETERSON.

Witnesses:
HENRY CHADBOURNE,
HARRY VENBLAD.